May 20, 1952 — H. F. SPATZ — 2,597,196
AUTOMOBILE WHEEL SANDER
Filed May 1, 1950
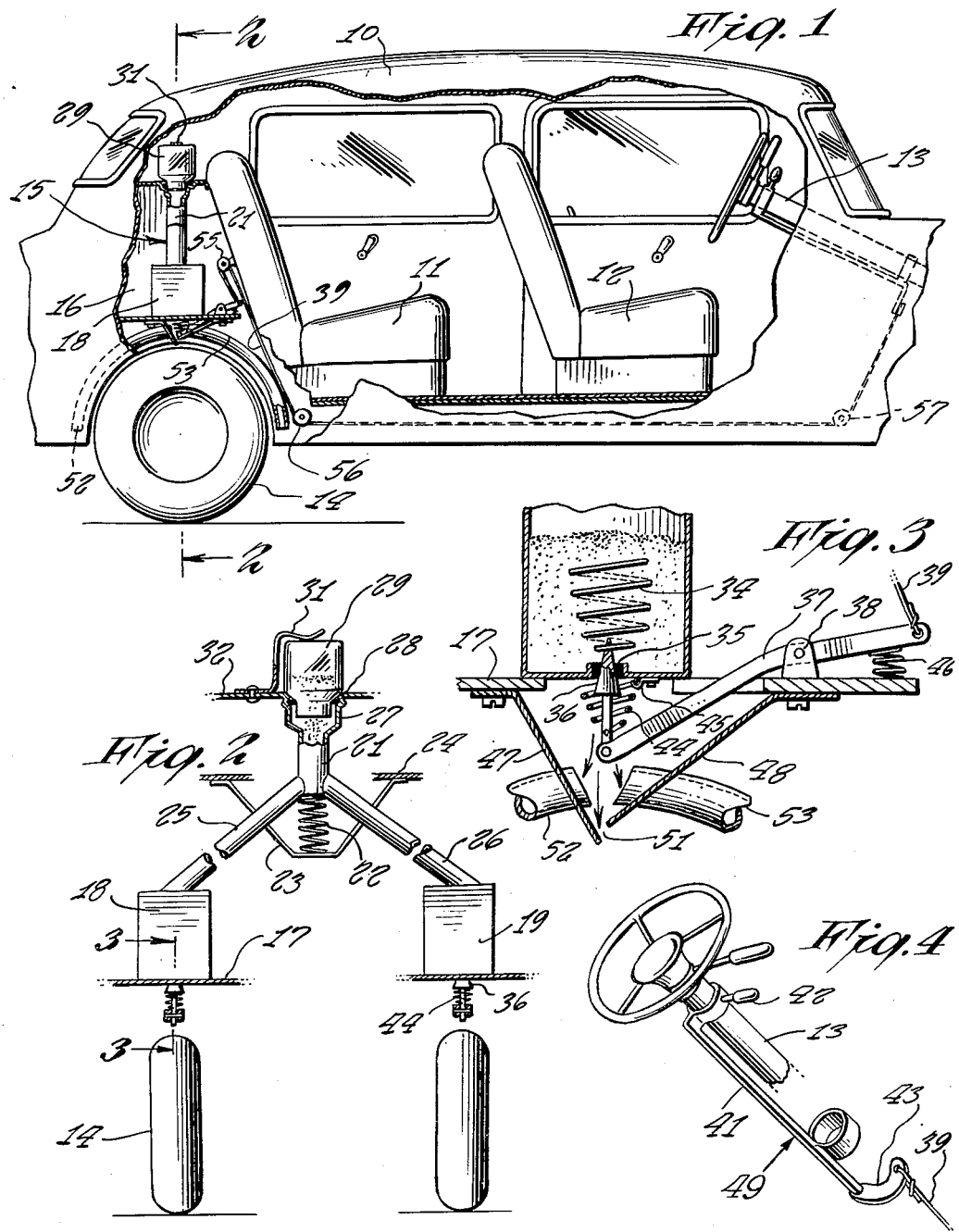
INVENTOR.
HARRY FRED SPATZ
BY
Carl Miller
ATTORNEY Patented May 20, 1952

2,597,196

UNITED STATES PATENT OFFICE 2,597,196

AUTOMOBILE WHEEL SANDER

Harry Fred Spatz, Richmond Hill, N. Y.

Application May 1, 1950, Serial No. 159,293

1 Claim. (Cl. 291—36)

This invention relates to an automobile wheel sander.

It is an object of the present invention to provide an automobile wheel sander which is adapted to be mounted in the rear of the automobile body and over the rear wheels in such a manner that the sand can be added to the sander by the simple inverting of a jar accessible over the rear seat of the automobile and held therein by a clip.

It is another object of the invention to provide in an automobile sander tubular means extending from a location over the top of the wheel to the forward and rearward face of the wheel in such a manner that sand will be distributed in the front and rear of the wheel and directly thereunder.

It is another object of the present invention to provide spring mounting means for supporting the upper distributing tube or manifold such that it will be vibrated and the sand urged through the tube to the boxes lying over the respective wheels from which the sand is dispensed.

Other objects of the present invention are to provide an automobile sander for distributing sand over the rear wheels which is of simple construction, inexpensive to manufacture, compact, has a minimum number of parts, easily accessible, and efficient in operation.

The invention has some bearing upon the sanding devices disclosed in my prior Patents 2,322,171, patented June 15, 1943, and 2,507,738, patented May 16, 1950, but has improvements and features different therefrom.

For other objects and for a better understanding of the invention, reference may be had to the following detailed description taken in connection with the accompanying drawing, in which Fig. 1 is a fragmentary side elevational view of an automobile with portions broken away to show the sanding device embodying the features of the present invention and its location over the rear wheels of the automobile.

Fig. 2 is a vertical sectional view taken on line 2—2 of Fig. 1.

Fig. 3 is an enlarged vertical sectional view taken on line 3—3 of Fig. 2.

Fig. 4 is a fragmentary perspective view of the control members located upon the steering wheel post of the automobile.

Referring now to the figures, 10 represents an automobile body having the usual seats 11 and 12 and a steering post 13. The rear of the body is supported upon rear wheels 14 and above these rear wheels and in the rear of the body is located the sanding device 15 embodying the features of the present invention.

In the rear of the automobile is a compartment 16 in which the sanding device is mounted. This compartment has a floor 17 on which sand boxes 18 and 19 are supported and respectively at locations over the respective rear wheels 14 of the body.

Lying above the boxes 18 and 19 is a distributing or feeder tube 21. This tube is mounted upon a spring 22 resting upon a bracket 23 that is connected to a part 24 of the automobile body. This distributing tube 21 can be balanced on the spring and will have some play to make certain the movement of the sand therethrough. The vibration of the automobile may be imparted to the tube 21 in order to shake the sand through the feeding portions 25 and 26 that lead respectively to the boxes 18 and 19. On the upper end of the tube 21 is an enlargement 27 having a rubber cushioning ring 28 for receiving an inverted jar receptacle 29 from which said is dispensed. A bracket clip 31 is connected to a top board 32 in the rear of the automobile and in rear of the rear seat 11 for retaining the jar receptacle 29 in place. The jar 29 is thus easily accessible from the rear seat of the automobile and its contents can be easily replenished.

In each of the boxes 18 and 19 is a conical spring 34 that is fixed to the bottom of the box adjacent to its outlet 35, and connected to a tapered valve element 36 that is worked by a long lever 37 pivoted upon a bracket 38 and connected by a cable 39 to a rotatable mechanism 41 on the steering post 13 of the automobile. The mechanism 49 can be turned on the steering post by grasping a handle 42 and as it is turned, arm 43 will pull or release cable 39. A spring 44 is connected to the valve element 36 and reacts against the bottom of the box to return the valve element 36 to its closed position. The other end of the spring is connected to the box by a clamp 45 so that a pulling action is effected upon the valve element 36. A spring 46 is connected between the other end of the lever 37 and the floor 17 and is a pull spring to further assist the closing movement of the valve element 36.

Beneath each box at the opening 35 thereof are plates 47 and 48 which are inclined toward each other, but spaced therefrom at their ends, as indicated 51, to allow sand to drop onto the top of the tire 14. Connected to the plate 47 is a delivery hose 52 through which sand can pass in order that the sand will be delivered near to the ground and at the rear of the wheel. Connected to the plate 48 is a delivery tube 53 through which sand may pass in order that it may be delivered to the ground in front of the wheel 14. The inner opening of the delivery tubes 52 and 53 is disposed in an acute angle to their axis (Fig. 3) in order to assure feeding of sand into the delivery tubes. Accordingly, sand is delivered to three different locations relative to the rear wheel 14. The cable passes through the body 10 over pulleys 55, 56, 57.

While various changes may be made in the detail construction, it shall be understood that such changes shall be within the spirit and scope of the present invention as defined by the appended claim.

Having thus set forth and disclosed the nature of my invention, what is claimed is:

In an automobile sand dispensing device, a storage box for sand mounted on the automobile and having a bottom opening therein, a valve element operable in the opening, means for operating said valve element, a distributing chamber disposed below the said storage box and comprising two plates inclined towards each other and spaced from one another at their lower ends for the passage of sand therebetween and upon a wheel lying thereunder, delivery tubes extending from said distributing chamber, respectively, forwardly rearwardly over the wheel, the inner opening of said delivery tubes being disposed in an acute angle to their axis in order to assure feeding of sand into the delivery tubes.

HARRY FRED SPATZ.

REFERENCES CITED

The following references are of record in the file of this patent:

UNITED STATES PATENTS

| Number | Name | Date |
| --- | --- | --- |
| 2,211,256 | Dashner | Aug. 13, 1940 |
| 2,223,722 | Farrell | Dec. 3, 1940 |
| 2,507,738 | Spatz | May 16, 1950 |